(No Model.)

A. FONTAYNE.
AXLE BOX.

No. 315,927. Patented Apr. 14, 1885.

Attest:
Jno. C. Tyler
E. F. Brooks

Inventor:
Albert Fontayne
per
Robert Burns
Attorney.

UNITED STATES PATENT OFFICE.

ALBERT FONTAYNE, OF CHICAGO, ILLINOIS.

AXLE-BOX.

SPECIFICATION forming part of Letters Patent No. 315,927, dated April 14, 1885.

Application filed August 21, 1884. (No model.)

*To all whom it may concern:*

Be it known that I, ALBERT FONTAYNE, a citizen of the United States, and a resident of Chicago, in the county of Cook and State of Illinois, have invented certain new and useful Improvements in Axle-Boxes, of which the following is a specification.

This invention relates to that class of axle-boxes for carriages and other vehicles in which a fixed collar is arranged upon the axle and is engaged by the axle-box through the medium of a proper securing device.

The object of my improvements are, first, to provide a cheap and reliable construction of parts possessing the following requisites: retaining the lubricant within the box, preventing the dripping and waste of the same, and thus enabling the vehicle or wheel to run for a much longer period than with the usual form of axle-boxes; second, to furnish means to prevent the unscrewing of the holding or follower nut of box upon the backing or reversal of the wheel, and at the same time take up or remove all the lateral wear from the main portion of the box and the holding or follower nut. I attain such objects by the construction of parts illustrated in the accompanying drawings, in which—

Figure 1:
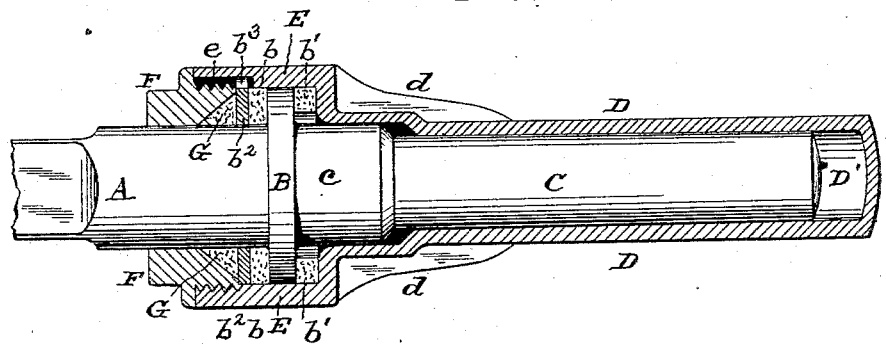
Figure 2:
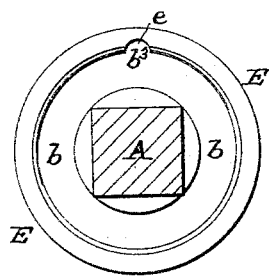
Figure 3:
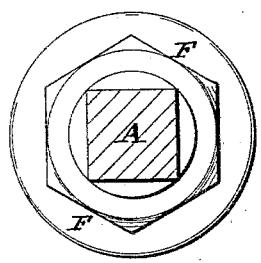

Figure 1 is a longitudinal axial section of my improved box, the axle proper being shown in elevation. Fig. 2 is a rear end view of the box with the follower nut removed; and Fig. 3 is a rear end view with the follower-nut in place.

Similar letters of reference indicate like parts in the several views.

In its general form the present improvement resembles that shown in Letters Patent No. 293,960, issued to me February 19, 1884, for axle-attaching device.

As illustrated in the drawings, A represents a portion of the main axle, having a flange or collar, B; C, the spindle, preferably formed with an enlarged shoulder, $c$, at its abutment to the axle-collar B, and D the main portion of the axle-box, provided with the usual splines or fins, $d$, for attaching the hub to the box.

E is an enlarged flange or collar at the inner end of the box, formed integral with the main portion of the box, and having its interior partially screw-threaded, so as to receive the follower or locking nut or gland F. The recess formed by the nut F receives the axle flange or collar B, with its packing or wear rings $b$ $b'$, of leather or other analogous material, and the metal lock ring or washer $b^2$. This washer is made to turn with the box by means of one or more outwardly-projecting teats, $b^3$, which fit a groove or grooves, $e$, in the enlarged box, flange, or collar E, (see Figs. 1 and 2,) so as to compel the washer to rotate with the box. By this means friction against the end of the follower or holding nut F is entirely prevented, and the danger of the same unscrewing and letting the wheel escape upon a reversal or backing of the vehicle-wheel is entirely obviated.

The follower-nut is cupped out so as to form an annular recess to receive a packing, G, of cotton or other equivalent material, to absorb any oil escaping from the interior of the box, prevent it dripping out and marring the appearance of the buggy wheel or axle, and at the same time exclude dust and grit from the axle or bearing.

It is preferable to close the front end of box, as shown, and make it somewhat longer than the axle-spindle, in order to form a chamber, D', to contain a supply of lubricant.

In use the rear packing or wear ring, $b$, will be split or made in halves, in order to permit of its insertion around the axle behind the axle-collar B.

Having thus fully described my invention, what I claim, and desire to secure by Letters Patent, is—

1. The combination of the axle-box D, provided with an enlarged internally-screw-threaded flange or collar, E, having groove $e$, the nut F, locking ring or washer $b^2$, having outwardly-projecting teat, $b^3$, and axle A, provided with flange or collar B, essentially as set forth.

2. The combination of the axle-box D, provided with an enlarged internally-screw-threaded flange or collar, E, having groove $e$, the nut F, locking ring or washer $b^2$, having outwardly-projecting teat, $b^3$, packing or wear rings $b$ $b'$, and axle A, provided with flange or collar B, essentially as set forth.

3. In an axle-box as herein described, the combination of the axle-collar B, locking-ring $b^2$, nut F, recessed to receive a packing, G, and the box D E, essentially as set forth.

In testimony whereof witness my hand this 12th day of August, 1884.

ALBERT FONTAYNE.

In presence of—
ROBERT BURNS,
JNO. C. TYLER.